(12) United States Patent
Cui et al.

(10) Patent No.: US 8,249,642 B2
(45) Date of Patent: Aug. 21, 2012

(54) USING THE REPETITION OF AN ERASURE INDICATOR BIT TO ENHANCE A POWER CONTROL COMMAND DURING HANDOFF

(75) Inventors: Dongzhe Cui, Parsippany, NJ (US); Yuan-Rong Shen, Randolph, NJ (US)

(73) Assignee: Alcatel Lucent, Paris (FR)

(*) Notice: Subject to any disclaimer, the term of this patent is extended or adjusted under 35 U.S.C. 154(b) by 76 days.

(21) Appl. No.: 12/828,466

(22) Filed: Jul. 1, 2010

(65) Prior Publication Data
US 2010/0284371 A1  Nov. 11, 2010

Related U.S. Application Data

(63) Continuation of application No. 11/341,333, filed on Jan. 27, 2006, now abandoned.

(51) Int. Cl.
*H04B 7/00* (2006.01)
(52) U.S. Cl. .......... 455/522; 455/422.1; 455/442; 370/331
(58) Field of Classification Search .......... 455/522, 455/422.1, 436–444; 370/331
See application file for complete search history.

(56) References Cited

U.S. PATENT DOCUMENTS

| | | | |
|---|---|---|---|
| 6,298,241 B1 | 10/2001 | Hong | |
| 6,397,043 B1 | 5/2002 | Kang | |
| 6,501,958 B1 * | 12/2002 | Hwang et al. | 455/522 |
| 7,139,537 B2 | 11/2006 | Nakayama | |
| 2001/0040880 A1 * | 11/2001 | Chen et al. | 370/337 |
| 2004/0047327 A1 * | 3/2004 | Chen | 370/342 |
| 2004/0157635 A1 | 8/2004 | Park et al. | |
| 2005/0174979 A1 | 8/2005 | Chen et al. | |
| 2005/0208961 A1 | 9/2005 | Willenegger | |

FOREIGN PATENT DOCUMENTS

WO  0161884 A1  8/2001

OTHER PUBLICATIONS

"Physical Layer Standard for CDMA2000 Spread Spectrum System," Revision D, 3GPP2 C.S0002-D, Version 2.0, 3GPP, Sep. 2005, p. 2-131 to 2.138, p. 3-130 to 3.133.

* cited by examiner

*Primary Examiner* — Vladimir Magloire
(74) *Attorney, Agent, or Firm* — Carlson Gaskey & Olds PC

(57) ABSTRACT

A wireless communication network (20) includes a power control technique that includes repeating an erasure indicator bit in a transmission from a mobile station (22) to a base station (24, 30, 36). The repeated erasure indicator bit is transmitted on the uplink to each base station. The base station then uses the majority rule of those repeated erasure indicator bits to adjust its transmit power. It results in a desired power control command corresponding to the quality of a downlink between a base station (24, 30, 36) and the mobile station (22). A disclosed example includes using the repeated error indicator bit for deciding whether a recent frame should be considered an erasure. If so, the base station increases power on the downlink forward channel. If not, the base station decreases the transmit power on the downlink forward channel. A disclosed example includes alternative power control adjustment techniques, depending on the recent history of the quality of the downlink.

15 Claims, 2 Drawing Sheets

USING THE REPETITION OF AN ERASURE INDICATOR BIT TO ENHANCE A POWER CONTROL COMMAND DURING HANDOFF

CROSS REFERENCE TO RELATED APPLICATIONS

This application is a continuation of U.S. patent application Ser. No. 11/341,333, filed Jan. 27, 2006, which is now abandoned.

FIELD OF THE INVENTION

This invention relates to communications. More particularly, this invention relates to wireless communications.

DESCRIPTION OF THE RELATED ART

Wireless communication systems are in widespread use. Typical arrangements include a plurality of base stations strategically positioned to provide wireless communication coverage over selected geographic regions. A mobile station such as a cell phone or notebook computer communicates with the wireless communication network through a base station that serves the region within which the mobile station is located. There are various signaling techniques that are implemented to provide desired service levels and signaling quality.

One technique includes power control. There are two-way communications between a mobile station and a base station. Communications from the base station to the mobile station are typically referred to as downlink communications. Communications from the mobile station to the base station are typically referred to as uplink communications. One aspect of power control in wireless communication systems includes the mobile station reporting to the base station the quality of the downlink. It is typical to include a specific power control command signal on a reverse power control sub-channel. The base station responds by adjusting the transmission power on the downlink. There are known techniques for such power control.

As mobile stations travel, different base stations serve the mobile station as it moves between the various regions covered by the different base stations. In some situations, a mobile station will be in soft handoff during which the mobile station communicates simultaneously with more than one base station. Under such circumstances, the mobile station typically reports the quality of the downlink of each base station back to it. Each base station then uses that information to adjust the transmit power on the downlink to ensure that the link with the mobile station is not lost before the mobile station completes a handoff, for example.

There are situations where the power control commands between the mobile station and a base station might be blurred because of the fast fading channel such that the power control command is not successfully received by the base station. If a base station misinterprets a power control message, the wireless phone call may be terminated contrary to the intentions of the mobile user.

There is a need for an improved technique that will minimize the chances of a base station not receiving a power control command or erroneously interpreting a received power control command.

This invention provides an improved power control signaling technique.

SUMMARY OF THE INVENTION

An exemplary method of communicating includes using a repeated erasure indicator bit within a frame as an indication of a power control command.

One example includes repeating an erasure indicator bit sixteen times within a frame. A base station receives the frame and determines whether a majority of the erasure indicator bits within the frame corresponds to an erasure set by the mobile station. If so, the base station interprets that as a power control command for increased transmit power on the downlink. If not, the base station responds by decreasing the transmit power on the downlink.

Using a repeated erasure indicator bit increases the likelihood that the base station will receive the appropriate information regarding the desirability of an increase or decrease in downlink transmit power. The disclosed example does not rely upon a power control command separate from the erasure indicator bit. Instead, the repeated erasure indicator bit provides the indication of the desired power control. Having a repeated erasure indicator bit increases the likelihood that the base station will receive the desired indication and respond appropriately with an adjustment to the downlink transmit power.

The various features and advantages of this invention will become apparent to those skilled in the art from the following detailed description. The drawings that accompany the detailed description can be briefly described as follows.

DETAILED DESCRIPTION

This invention is useful for power control within wireless communication systems. An example implementation of this invention during a soft handoff procedure is described for purposes of illustration. Those skilled in the art who have the benefit of this description will realize applicable uses of the inventive power control technique to meet the needs of their particular situation.

Figure 1:
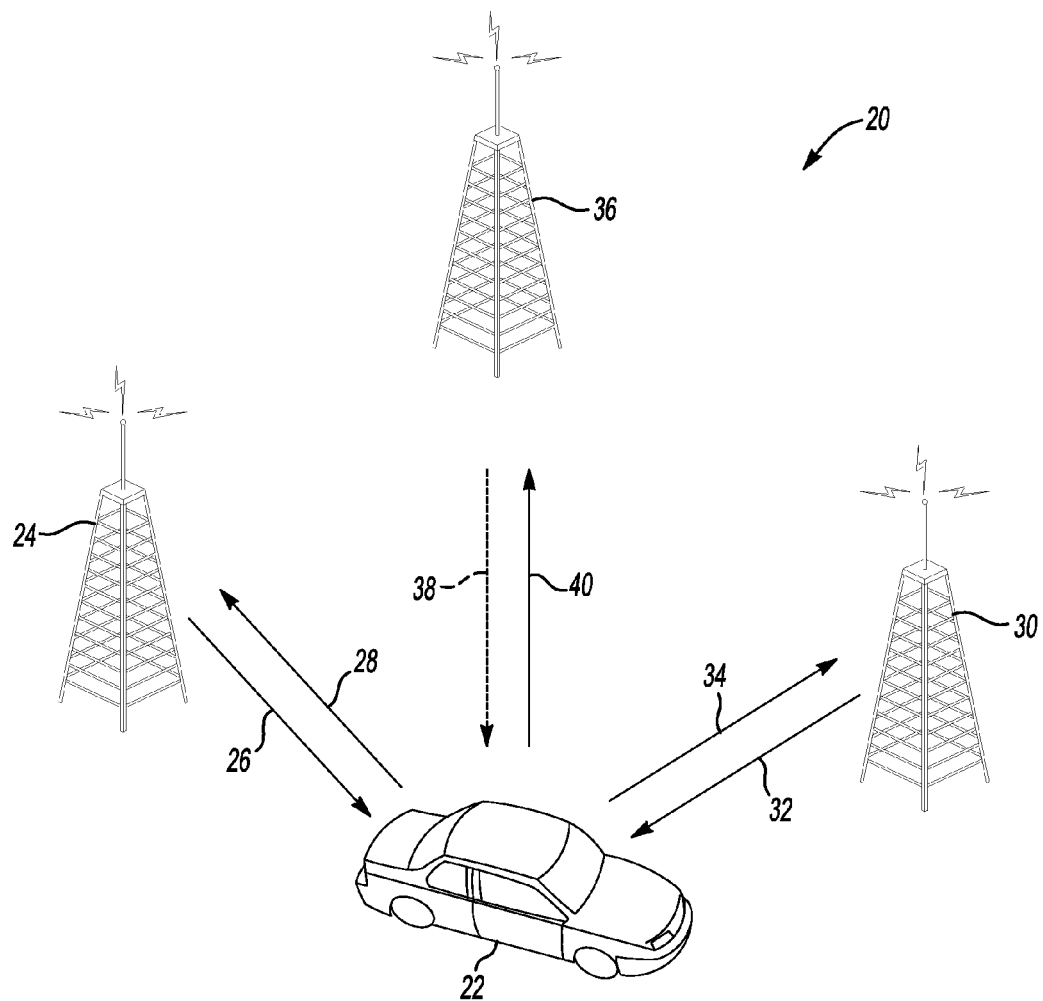
FIG. 1 schematically illustrates selected portions of a wireless communication system that is useful with an embodiment of this invention.

FIG. 1 schematically illustrates selected portions of a wireless communication system 20. A mobile station 22 communicates with at least one base station 24. Communications between the mobile station 22 and the base station 24 occur over a downlink 26 and an uplink 28.

The mobile station 22 may be a cellular phone, notebook computer, personal digital assistant or other communication device that is capable of communicating in a wireless communication system. When the mobile station 22 is within the geographic region served by the base station 24, for example, it communicates with that base station.

At times, the mobile station 22 will handoff between base stations. The illustration in FIG. 1 schematically shows a soft handoff scenario. The mobile station 22 is simultaneously in communication with the base station 24 and another base station 30. Communications between the mobile station 22 and the base station 30 occur over a downlink 32 and an uplink 34. In the example of FIG. 1, the mobile station 22 also communicates with a base station 36. Communications between the mobile station 22 and the base station 36 occur over a downlink 38 and an uplink 40.

In the illustrated example, most of the communication links are sufficiently strong to provide reliable communications between the mobile station 22 and the base stations. The downlink 38 and uplink 40 between the base station 36 and the mobile station 22, however, are relatively weaker. The transmit power on the link 38 should be increased. The transmit power on the downlinks 26 and 32 may be decreased or held at a current level.

The mobile station 22 communicates with each of the base stations using a signaling technique for providing an indication of a desired power control that improves the reliability of communicating power control commands between the mobile station 22 and each of the base stations 24, 30 and 36.

Figure 2:
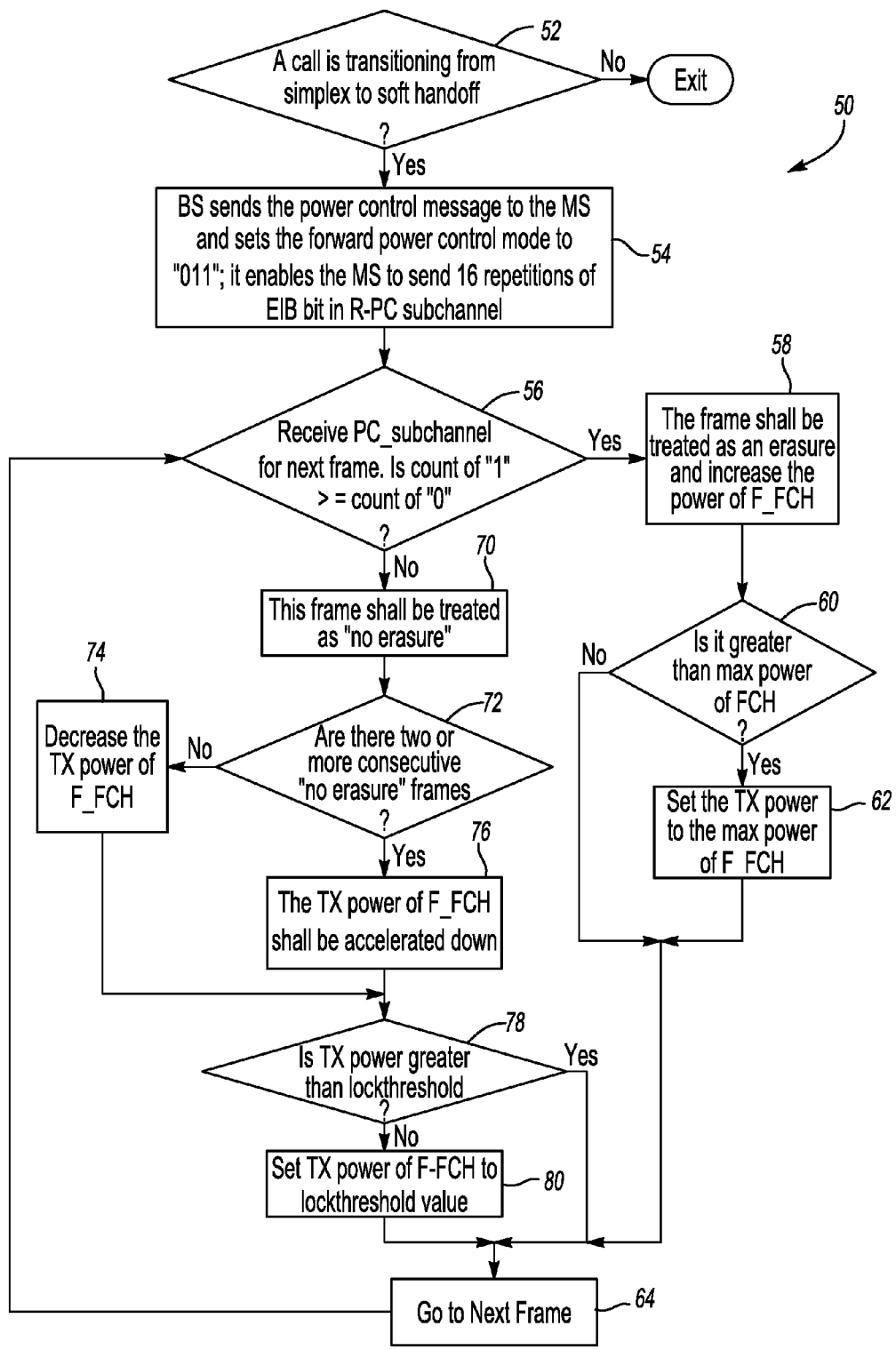
FIG. 2 is a flowchart diagram summarizing one example approach.

FIG. 2 includes a flowchart diagram 50 that summarizes one example approach. For purposes of discussion, the example of FIG. 2 includes the mobile station 22 being in soft handoff and communicating using the CDMA 2000 standard. The flowchart 50 begins at 52 where a determination is made whether the mobile station is in soft handoff. If not, the rest of the process in FIG. 2 need not be carried out in this example.

Assuming that the mobile station 22 is in soft handoff mode, at least one of the base stations sends a power control message to the mobile station at 54 to set the forward power control mode to a mode corresponding to desired communications during soft handoff. In the illustrated example, this includes setting the forward power control mode using the "011" FPC_MODE according to the CDMA 2000 standard. The mobile station 22 responds to this mode indication by repeating an error indicator bit on the reverse power control sub-channel. In one example, every power control group in each frame (e.g., 16 power control bits) on the reverse power control sub-channel is set to the error indicator bit. In one example, a 20 millisecond frame includes sixteen repetitions of the error indicator bit. In other words, the error indicator bit is repeated sixteen times in one example. This provides an effective feedback rate of 50 bits per second in such an example.

At 56, the base station receives the frame including the repeated error indicator bit. The base station determines how many of the error indicator bits have a value of 1 and how many have a value of 0. The base station then determines which is the majority. In one example, the error indicator bit has a value of 1 for situations where the mobile station did not properly receive the most recent communication from the base station. An error indicator bit value of 0 indicates that a good frame is received by the mobile station 22.

In the example of FIG. 2, when there are more error indicator bits with the value 1 than the value 0 received at a base station, the process continues at the step indicated at 58 such that the frame is treated as an erasure. Under such circumstances, the repeated error indicator bit provides an indication of a power control command corresponding to a desired increase in the transmit power on the downlink or forward channel. In other words, the value of the majority of the received erasure indicator bits results in a desired power control command.

In one example, the transmit power on the fundamental forward channel (e.g., on the downlink) is adjusted using a preselected increment. One example includes adjusting the downlink power $P_{F\text{-}FCH}$ using the equation $P_{new\_F\text{-}FCH} = P_{F\text{-}FCH} + \Delta_{up}$. In one example, $\Delta_{up}$ is 0.5 dB.

In FIG. 2, at 60, a determination is made whether the adjustment to the downlink transmit power level makes it greater than the maximum power allowable on the particular forward channel. If not, then the adjusted value is used for the transmit power on the forward channel. In the event that the adjustment to the downlink transmit power level exceeds the maximum, the example of FIG. 2 includes a step at 62 where the transmit power is set to the maximum power level available. The process continues at 64 for the next frame.

When the determination made at 56 is that there are more "0" erasure indicator bits than those having the value "1", that frame is treated as a "no erasure" at 70. When a majority of the received erasure indicator bits within a frame have the value zero, the base station interprets that as an indication of a power control command allowing for a decrease in the transmit power on the downlink. The example of FIG. 2 includes two options for decreasing the transmit power. A determination is made at 72 whether there have been two or more consecutive "no erasure" frames. If not, the process proceeds at 74 to decrease the transmit power on the forward channel using a preselected decrement. One example includes adjusting the downlink transmit power $P_{F\text{-}FCH}$ using the equation $P_{new\_F\text{-}FCH} = P_{F\text{-}FCH} - \Delta_{down}$. In one example, $\Delta_{down} = 0.02$ dB.

When there are two or more consecutive "no erasure" frames, that is an indication of a very good quality downlink. Accordingly, the transmit power on the downlink may be accelerated down at a faster rate. This is accomplished in the example of FIG. 2 at 76 where the transmit power on the forward channel is accelerated down. One example includes using the equation $P_{new\_F\text{-}FCH} = P_{F\text{-}FCH} - \sqrt{N}\, \Delta_{down}$, where N is the number of consecutive good or "no erasure" frames. Using this number as a factor for multiplying the amount by which the transmit power is decreased allows for further decreasing the transmit power based upon the recent history on that particular channel.

The example of FIG. 2 includes a determination at 78 regarding whether the decreased transmit power is within an acceptable level. The determination at 60 assures that the transmit power does not get too high. The determination at 78 assures that the transmit power does not get too low. As known, a forward channel transmit power for a base station should be greater than a forward channel lock threshold to avoid dropping that link. The determination at 78 includes determining whether the decreased transmit power is greater than the lock threshold. If not, an adjustment is made at 80 to ensure that the transmit power is at least equal to the lock threshold value. If the decreased downlink transmit power is greater than the lock threshold, then the procedure continues at 64 without making the adjustment at 80.

Applying a repeated error indicator bit on a reverse power control sub-channel improves the forward power control and provides more robust and more reliable power control commands that can help to eliminate mobile call drop in many situations. The disclosed example is particularly useful during soft handoff, for example.

The repeated error indicator bit is essentially cumulative and combined at each base station over the number of power control groups within which the error indicator bit is repeated (e.g., 16 power control groups over 20 milliseconds in the above example). That provides more robust and reliable information regarding frame erasure transmitted on the forward link by each base station. Even for a base station with a weak link, the above-described example improves the effective signal to noise ratio of the received error indicator bit soft metric. The disclosed example results in a more reliable decision regarding frame erasure.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A method of communicating, comprising
   using a repeated erasure indicator bit that is repeated a plurality of times within a single frame as an indication of a power control command from a mobile station;

wherein the repeated erasure indicator bit has a first value when a previous frame received at the mobile station comprises an erasure and the repeated erasure indicator bit has a second, different value when a previous frame was successfully received at the mobile station;

receiving the repeated erasure indicator bit; and determining whether a number of the received bits having the first value exceeds a number of the received bits having the second value.

2. The method of claim 1, comprising receiving the repeated erasure indicator bit; and adjusting a forward link transmit power level in a manner corresponding to a value of at least a majority of the received repeated erasure indicator bit.

3. The method of claim 2, comprising automatically increasing the transmit power level using a predetermined increment when the repeated erasure indicator bit indicates a command for increased transmit power.

4. The method of claim 2, comprising determining whether using a predetermined increment for increasing the transmit power level will result in the transmit power level exceeding a maximum level; and increasing the transmit power level by the predetermined increment if using the predetermined increment will not result in the transmit power level exceeding the maximum level; or setting the transmit power level to the maximum level if using the predetermined increment will result in the transmit power level exceeding the maximum level.

5. The method of claim 2, comprising automatically decreasing the transmit power level using a predetermined amount when the repeated erasure indicator bit indicates a command for decreased transmit power.

6. The method of claim 5, comprising determining a number of consecutive frames in which the repeated erasure indicator bit indicates a command for decreased transmit power; and decreasing the transmit power by the predetermined amount when the determined number is below a threshold; or decreasing the transmit power by the predetermined amount multiplied by a factor comprising the determined number when the determined number exceeds the threshold.

7. The method of claim 6, wherein the factor comprises the square root of the determined number.

8. The method of claim 6, wherein the threshold comprises two consecutive frames.

9. The method of claim 2, comprising determining whether using a predetermined amount for decreasing the transmit power level will result in a transmit power level that is below a lock threshold; and decreasing the transmit power level by the predetermined amount if decreasing the transmit power level by the predetermined amount will result in a transmit power level exceeding the lock threshold; or setting the transmit power level to the lock threshold level if decreasing the transmit power level by the predetermined amount will result in a transmit power level below the lock threshold.

10. The method of claim 1, wherein the erasure indicator bit is repeated a number of times corresponding to an entire set of power control groups within the frame.

11. The method of claim 1, wherein the erasure indicator bit is repeated 16 times within the frame.

12. The method of claim 1, comprising using the repeated erasure indicator bit during soft handoff.

13. The method of claim 1, wherein the repeated erasure indicator bit first value is 1 and the second value is 0.

14. The method of claim 13, wherein the repeated erasure indicator bit value of 1 corresponds to a power control command for increasing transmit power on a forward link and the value of 0 corresponds to a power control command for decreasing the transmit power.

15. The method of claim 13, comprising increasing a forward link transmit power when the number of the received bits having the value 1 exceeds the number having the value 0; or decreasing the forward link transmit power when the number of the received bits having the value 0 exceeds the number having the value 1.

* * * * *